United States Patent [19]

Cormier et al.

[11] Patent Number: 5,584,042

[45] Date of Patent: Dec. 10, 1996

[54] DYNAMIC I/O DATA ADDRESS RELOCATION FACILITY

[75] Inventors: Roger L. Cormier, Pleasant Valley; Steven G. Glassen, Wallkill; Moon J. Kim, Wappingers Falls; Allen H. Preston, Poughkeepsie, all of N.Y.

[73] Assignee: International Business Machines Corporation, Armonk, N.Y.

[21] Appl. No.: 71,160

[22] Filed: Jun. 1, 1993

[51] Int. Cl.$^6$ ...................................................... G06F 13/00
[52] U.S. Cl. .......................... 395/856; 395/480; 395/492; 395/497.04; 364/245.2; 364/246.11; 364/246.3; 364/931.43; 364/965.3; 364/DIG. 1; 364/DIG. 2
[58] Field of Search ..................................... 395/480, 492, 395/497.04, 700, 856

[56] References Cited

U.S. PATENT DOCUMENTS

| | | | |
|---|---|---|---|
| 4,128,875 | 12/1978 | Thurber et al. | 395/421.1 |
| 4,456,954 | 6/1984 | Bullions, III et al. | 395/417 |
| 4,467,411 | 8/1984 | Fry et al. | 395/250 |
| 4,476,524 | 10/1984 | Brown et al. | 395/306 |
| 4,674,038 | 6/1987 | Brelsford et al. | 395/182.13 |
| 4,695,950 | 9/1987 | Brandt et al. | 395/417 |
| 4,742,450 | 5/1988 | Duvall et al. | 395/700 |
| 4,779,188 | 10/1988 | Gum et al. | 395/500 |
| 4,785,392 | 11/1988 | Maier et al. | 395/375 |
| 4,792,895 | 12/1988 | Tallman | 395/375 |
| 4,831,541 | 5/1989 | Eshel | 395/146 |
| 4,843,541 | 6/1989 | Bean et al. | 395/856 |
| 4,945,480 | 7/1990 | Clark et al. | 395/700 |
| 4,980,822 | 12/1990 | Brantley, Jr. et al. | 395/400 |
| 5,117,350 | 5/1992 | Parrish et al. | 395/425 |

*Primary Examiner*—Frank J. Asta
*Attorney, Agent, or Firm*—Lynn L. Augspurger; Laurence J. Marhoefer

[57] ABSTRACT

For parallel, massively parallel and data server networks a zone relocation facility and dynamic I/O data address relocation facility which allows the relocation of memory space for partitions for on or more clients or guests while the client guest and one or more of the server/host or another client guest are actively executing I/O instructions. An I/O data address relocation facility includes an operation request block in the local storage of a client/guest with a second copy of the operation request block in a server/host located in the main store, and a comparator in the system channel subsystem. An application locates CCWs and IDAWS anywhere and the server/host will relocate data to its partition. The partition size can be expanded to allow dynamic response to a need for memory by changing the partition and moving data to the expanded partition while other activities are being processed.

12 Claims, 6 Drawing Sheets

DYNAMIC I/O DATA ADDRESS RELOCATION FACILITY

FIELD OF THE INVENTION

This invention is related to computer systems and particularly to a computer having a memory partition facility which may be changed.

CROSS REFERENCE TO RELATED APPLICATIONS

The following related applications represent some recent developments for systems with an environment in which the present invention may be used: U.S. Pat. No. 5,345,590, issued Sep. 6, 1994, which is a continuation of U.S. patent application Ser. No. 07/576,344 filed Aug. 31, 1990 by Ault et al. and entitled Method and Apparatus for Cross-Partition Control in a Partitioned Process Environment. The invention there described has been published in Europe, as an example, in European Patent Application publication 472, 861 on Jul. 5, 1991; and U.S. patent application Ser. No. 07/755,246 filed Sep. 5, 1991 by J. E. Bastick et al. and entitled Method and Apparatus for Dynamically Changing the Configuration of a Logically Partitioned Data Processing System, now U.S. Pat. No. 5,253,344, issued Oct. 12, 1993; and U.S. patent application Ser. No. 07/974,393 filed Nov. 10, 1992 by J. George et al. and entitled "Method of Using Small Addresses to Access Any Guest Zone in a Large Memory", now U.S. Pat. No. 5,371,867, issued Dec. 6, 1994; and U.S. patent application Ser. No. 08/014,977 filed Feb. 8, 1993 by K. J. Duvalsaint et al and entitled "Multi-Zone Relocation Facility Computer Memory System"; and U.S. patent application Ser. No. 07/816,911 filed Jan. 3, 1992 by J. G. Brenza et al and entitled "Guest Host Large Addressing Method and Means", now U.S. Pat. No. 5,426, 748, issued Jun. 20, 1995.

These co-pending applications and the present application are owned by one and the same assignee, International Business Machines Corporation of Armonk, N.Y.

The descriptions set forth in these co-pending applications are hereby incorporated into the present application by this reference.

GLOSSARY OF TERMS

For convenience we will define some terms as used in this application.

| | |
|---|---|
| Basic mode | A mode of operation of computer systems like the IBM ES/9000 where a hypervisor is not present and each control program and each control program executes directly on the machine. ES/9000 processors have both a basic mode and an LPAR mode. In the basic mode, processors may contain one or two physical partitions, e.g. 1 megabyte. Current IBM ESA/390 system can use logical (real or virtual) addressing that addresses up to, but not beyond, 2**31 or 2 Gigabytes in any virtual space and in real memory. However, virtual space is not so limited and can be raised, e.g. U.S. Pat. Application Ser. No. 07/816,911 filed January 3, 1992 by J. G. Brenza et al and entitled "Guest Host Large Addressing Method and Means" and U.S. Pat. 4,355,355 to Butwell et al. |
| CCW | Channel-Command Word |
| CEC | Central Electronic Complex. A modern computer system will contain at least one central processor (CP), a system memory (MS or main store) and an input/output (I/O) system usually containing an I/O controller in the form of a co-processor (CP) for channel control under program control of channel command words (CCW), and this system is included in a CEC which may, and usually does, contain additional resources. |
| DAT | Dynamic Address Translation |
| Expanded Store (ES) | Storage which is not part of the main system memory (main store) which is normally in the mainframe systems which derives from the System/370 IBM architectures which were limited to memory which may be addressed with a 32 bit arithmetic unit with 31 address bits. |
| Guests | Operating systems assigned by the host to a logical partition or zone in the memory of a computer system. |
| Host | A hypervisor program like VM which supervises all guest operating systems in different partitions of the system. |
| Hypervisor | A supervisory system of software or software and hardware which allows two or more operating systems to be run on the same physical CEC allowing concurrent logical processing with the same physical resources. The VM/370 was an early example. Supervisory program systems may simulate devices, e.g. IBM TDB of Vol. 16, No. 5, October, 1973 at 1386–1388 and TDB 02-74, p 3016–3017. |
| IDAW | Indirect-Data-Address Word |
| LPAR | A mode of a computer system in which physical partitions or sides may be logically segregated and each physical partition (PP) may contain many logical partitions (LPs). In LPAR mode a hypervisor is present which supports all control programs or operating systems in all logical partitions. Under hypervisor control the logical partition may be assigned to be used by a particular process/system. LPAR is a hypervisor and in an overall system context can be referred to as the "host." It can function as a data server within the environment of the present invention. |
| Main Store | Memory which is addressable by direct addressing in a computer. a.k.a. Main Storage |
| ORB | Operation Request Block is the operand of START SUBCHANNEL. It specifies the parameters to be used in controlling that particular start function. |
| OS | Operating System (a.k.a. Control |

-continued

| | |
|---|---|
| | Program or CP.) |
| Page or Page frames | A unit of real memory space which is used for a purpose, usually address translation and relocation. A page can be moved with virtual addressing between main store and expanded store. |
| PR/SM | IBM's Processor Resource/System Manager, a form of a host which is implemented in microcode or internal code. PR/SM is a trademark of International Business Machines Corporation. PR/SM refers to the machine hardware facility which allows the resources of a single physical system to be divided between distinct, predefined logical machines or "partitions." |
| VM | Virtual Machine, a software form of a host which supervises all guest operating systems in the different positions of a CEC. VM is a trademark of International Business Machines Corporation. |
| MVS | Multiple Virtual Storage, a software form of an operating system used as a guest. MVS is a trademark of International Business Machines Corporation. |
| MVS/ESA | Multiple Virtual Storage/Enterprise Systems Architecture. The computer system architecture of IBMs ES/9000 group of processors as introduced in September 1990. MVS/ESA utilizes MVS as a control program or operating system in a guest mode in a CEC. MVS/ESA and ES/9000 are trademarks of International Business Machines Corporation. |
| Server/host | A machine which can operate as a host or a data server which may have several clients or guests coupled in a network. |
| SSCH | START SUBCHANNEL instruction |
| Zone | A storage can be divided into blocks of storage location and it may be configured from all resources available to the Central Electronic Complex (CEC). |

BACKGROUND OF THE INVENTION

Inventions or advances in the computer system field should be useful in an open environment. The future systems open environment will include systems of the past as well as those of the future. IBM machines, Amdahl, and Hitachi machines employ hypervisors based upon IBM mainframe systems such as the System/390 (e.g. U.S. Pat. No. 4,564, 903). IBM's ES/9000 series can operate in basic and hypervisor mode with logical partitioning of resources. Partitions can be created to enable small machines within a hypervisor environment (See e.g. IBM TDB n7B of 12–91, p. 309) to enable shared use of memory in a multiprocessor system for a CEC. It would also be desirable to increase memory utilization and machine operating performance in parallel systems and networks which employ parallel machines and partitioned memory.

Partitions of memory are used for processors of parallel machines, in mainframes and in networked systems, and in massively parallel machines which have hundreds or even thousands of parallel processing nodes with a host or control processor controlling processing nodes. An early example of a massively parallel machine was the IBM RP3, a research machine. Another example, more current, would be the Connection Machines' CM-5. In such systems, a control processor coordinates the functions of parallel processing nodes connected by some son of interprocessor communication network. A computational node which can comprise a group of processing nodes grouped to use a partition of memory. IBM mainframe structures use a group of processors (each of which may have multiple functional units) operating in parallel. In IBM mainframes, as illustrated by U.S. Pat. No. 4,843,541 the real mode can be used, but a hypervisor mode also exists, which permits the data processing system to be partitioned into a plurality of logical partitions. The controlling system is called a host. This host, which could be a control processor in a massively parallel machine, or a data server in a networked system, utilizes host control code, hardware and microcode to enable guests or clients to operate in different partitions. A system can have main storage, expanded storage, and channel and subchannel resources assigned to different (with LPAR logical) partitions in the system so different clients or guests can process applications in the different partitions. In an environment with multiple processors, we recognize that there exists software that exploits channel DAT. It would be desirable to enable such older existing machines with their memory systems as well as those which we are developing to be able to operate in an environment where partition utilization is improved.

In addition it would be desirable if the development could be used with the current trend in computer systems which is to utilize hypervisor environments to exploit more and more the logical partitioning of a CEC into many systems. Each system requires it's own storage and must be able to address that storage as an entity that starts with address 0 and increases to the maximum allocated to it. In a system that doesn't support channel Dynamic Address Translation (DAT), the hypervisor performs CCW address translation prior to issuing START SUBCHANNEL (SSCH). It would also be desirable to allow the advance needed for memory utilization to be used in such systems which utilize channel Dynamic Address Translation as is the case with some older Japanese Computer Manufacturer's software.

One of the problems with partitions, in which a user program or application runs (whether it be a real or a logical partition), is that storage needs to be assigned to the partition. This is done by a control program or an administrator. U.S. Pat. No. 4,843,541 allowed automatic relocation of the absolute addresses of the I/O channel and subchannel resources in the system to their assigned partitions. Absolute and virtual addresses of different guest programming systems, as well as page addresses for any expanded storage, were relocated into their assigned partitions.

The IBM ES/3090 Processor Complex functions as a PR/SM machine having an LPAR hypervisor. The separation and allocation of the physical resources is supported by the interpretive-execution facility of the machine and is performed by the hypervisor internal code called "LPAR". Similarly, the individual partitions can be called "guest" machines. It would be desirable to allow client machines to be treated like guests in a multiple client/data server networked environment.

It would be desirable to increase memory utilization and machine operating performance in parallel systems as well as in network environments and other systems (like highly parallel and massively parallel machines) which employ multiple processors operating concurrently. It would be desirable to improve the functional parallelism (the hardware and controls which permit different functions to be performed concurrently, e.g. I/O and separate addition and multiplication) in both real and hypervisor controlled processing systems. However, one of the barriers for automatically doing this has been the partition control structure. In the past when partitions needed to be changed the machines had to be in a quiescent state. The machine configuration has been controlled from an administration console or data server in order to relocate memory space.

Any advance should be used in advanced parallel processors like the IBM ES/3090 and the more current ES/9000 series. The IBM ES/3090 could perform a sort of zone relocation, as will be described. A publication about this machine was the Processor Resource/Systems Manager Planning Guide for the ES/3090 Processor Complex, IBM Publication No. GA22-7123-3. An advance for an ES/9000 system has been described in a co-pending application in which there has been described a way to relocate memory space and to change its size and location in whole or in pad, see U.S. patent application Ser. No. 08/014,977 filed Feb. 8, 1993 by K. J. Duvalsaint et al and entitled "Multi-Zone Relocation Facility Computer Memory System" which is included by reference.

It would be desirable now to be able to relocate memory space for one or more clients or guests during active processing. It would be especially desirable to do this for existing kinds of systems such as we have described, as well as those which develop in the future. And it would further be especially desirable to provide a way of doing this for existing IBM ES/9000 systems which would be able to operate as processors which can process their own applications as well as function as data servers.(this would be a server/host) A problem with some of the operating systems which operate in these environments is that they use a virtual data address in the CCW. In order to support virtual CCW, the hypervisor (LPAR) is required to perform the CCW address translation prior to issuing a START SUBCHANNEL instruction.

How these disparate desires may be achieved in light of the barriers which must be overcome is addressed by the present invention.

SUMMARY OF THE INVENTION

With our inventions we will be able to relocate memory space for partitions for one or more clients or guests during active processing for existing systems and those which can be developed from our technology in the future. Our implementation enhances our zone relocation facility. In accordance with our zone relocation facility the dependency on the host absolute location of the guest space has been removed. Now a channel program need not be stopped and retranslated when a guest is relocated.

As a result, we have provided for a computer system having a main store and functional units located in a server/host, and for a plurality of clients having a copy of the server/host operating system or their own operating system and coacting with the server/host and/or another client of the server/host with a means for dynamically on the fly relocating memory space for one or more applications of a client while the client and one or more of the server/host or another client are actively processing applications.

Our invention supports client server partitions that reside in the same physical system but in different logical partitions. The server starts I/O operations that cause data to be read directly into the clients' storage. This is the result of our CCW dynamic memory partition relocation facility. Our CCW dynamic memory partition relocation facility provides a way for the CCW and the data address to be relocated in the same zone as specified in the subchannel. This CCW relocation also now allows CCWs and IDAWs to be located in a zone other than the one specified in the subchannel and the data address to be either in the zone where the START SUBCHANNEL Instruction is issued or in the zone specified in the subchannel.

The invention defines a bit in the ORB. This bit controls the translation of the CCW address.

The invention also defines a bit in the CCW and a bit in the IDAW. These bits control the translation of the data address.

When the bit (called virtual relocation bit, J) in the ORB is one, the CCW address is based on the zone of the issuer of the START SUBCHANNEL instruction. The bit (called address type bit, A) in the CCW specifies whether the data address is a start subchannel issuers address or an address in the zone specified in the start subchannel instruction.

When the J bit is one and the indirect-data-address (I) bit is one, the A bit in the IDAW specifies whether data address is a start subchannel issuers address or an address in the zone specified in the start subchannel instruction.

In accordance with our invention, the ability of the computer system to translate a CCW without modifying guest storage is extended. Now a program can access data from a guest and a server/host in a single channel program. It can ask the server/host to put data anywhere in its partition. As the partition size can be expanded, this allows a program to dynamically respond to a need for memory by changing the partition and moving data to the expanded partition while other activities are being processed. Now server/host channel command words (CCWs) can be located in the server/host zone and data in the guest zone. The guest zone is specified in the start subchannel instruction. The invention allows a computer system to use server/host data words (via IDAWs) located in the server/host with data to be located in the guest zone. The guest zone is specified in the start subchannel instruction. The guest can be a client of a data server which functions as the server/host, or a guest in a partition of a mainframe which has a host control program administering the system.

DETAILED DESCRIPTION OF EMBODIMENTS OF THE INVENTION GENERAL

Before turning to the drawings in detail we will describe a way of informing the hardware how to react when a relocation is required. It will be remembered that a problem with some of the operating systems which operate in these environments is that they use a virtual data address in the CCW. In order to support this type of data address, the hypervisor (LPAR) is required to perform the CCW translation prior to issuing a START SUBCHANNEL instruction. The translation is done by copying the CCWs into hypervisor storage (zone 0) and then translating the virtual data addresses to guest absolute addresses. Prior art translated the guest absolute addresses into host absolute addresses and then issued the SSCH instruction to initiate the I/O operation. Dynamic storage reconfiguration enhancements have made it possible to have a partition moved from one host absolute address location to another dynamically. This capability makes it necessary to serialize the I/O operations described with the movement of partitions and retranslate after a move has been completed, or have the hardware use data addresses that are based on the zone where the data is located. This invention provides a means of accomplishing the later of these two methods. This method also provides a way to support I/O operations for partitions that are located above the 2 GB line (>31 bit addressing).

Figure 1:
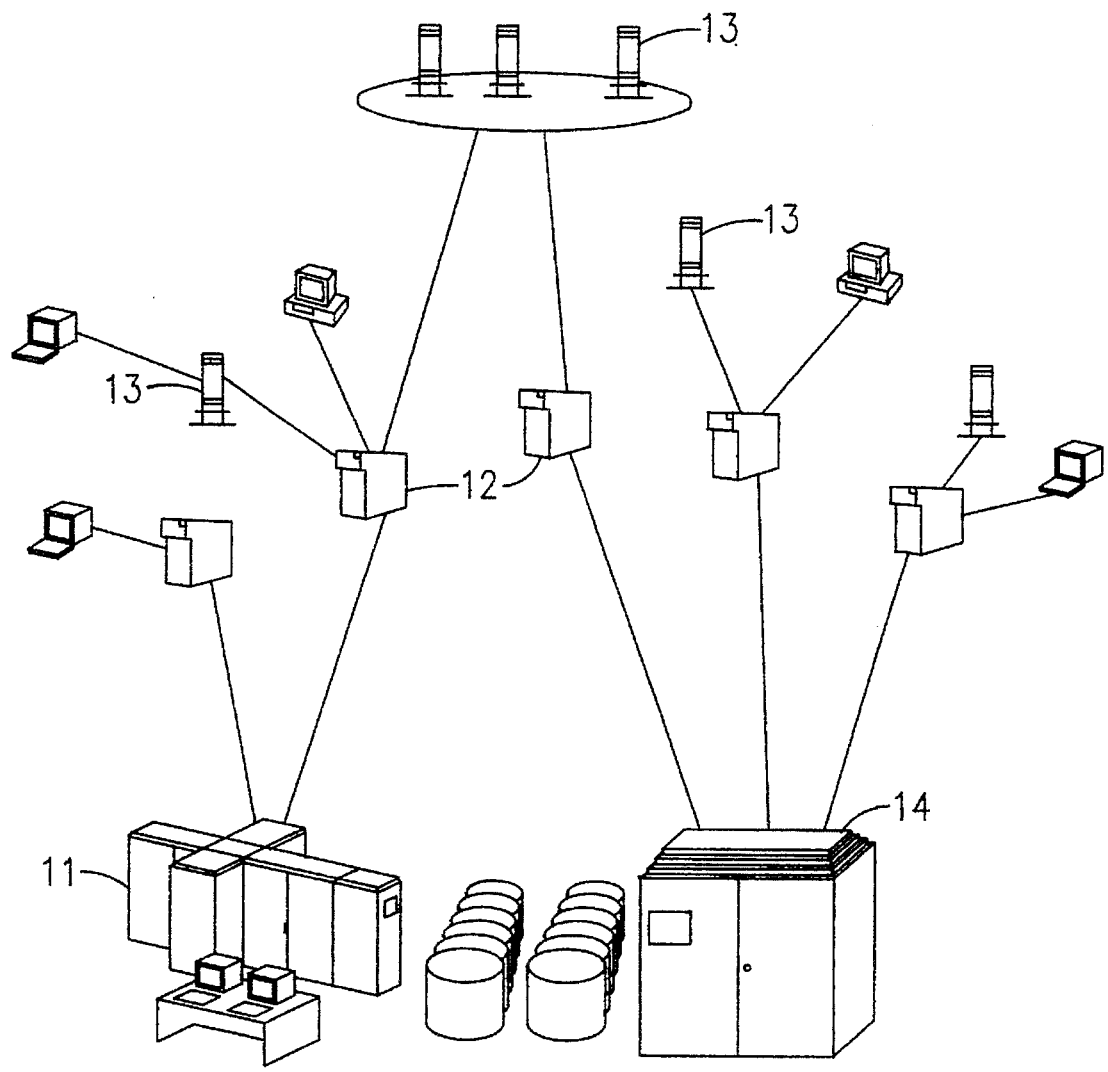
FIG. 1 shows schematically a computer system having the dynamic I/O data address relocation facility as pad of a server/host which can perform its functions as a data server for a plurality of clients and also act as a mainframe with PR/SM functions controlled under LPAR.

The environment in which we achieve our goals may be illustrated by FIG. 1. In FIG. 1 the server/host is the parallel processing computer system 11 or CEC which can employ operating systems which are managed by a hypervisor, like LPAR. Such a computer system 11 will have a few to many functional units and a main storage which may be accessed by the functional units of the CEC. One such system is the IBM ES/9000 series of mainframes, but this parallel processing computer system could be one of a number of different manufacturers. Another example would be an Amdahl machine which runs MDF. Another computer system which functions as a data server for a plurality of clients could also be the server/host 11 illustrated by the FIG. 1. FIG. 1 illustrates the computer system functioning as a server/host for a plurality of clients. These clients could be, and in the illustrated preferred embodiment are, pad of a LAN network. The LAN servers 12 couple the plurality of clients 13 to the server host 11, which is illustrated as an air cooled machine 11. The server/host 11 could equally be a water cooled server host 14.

Figure 2:
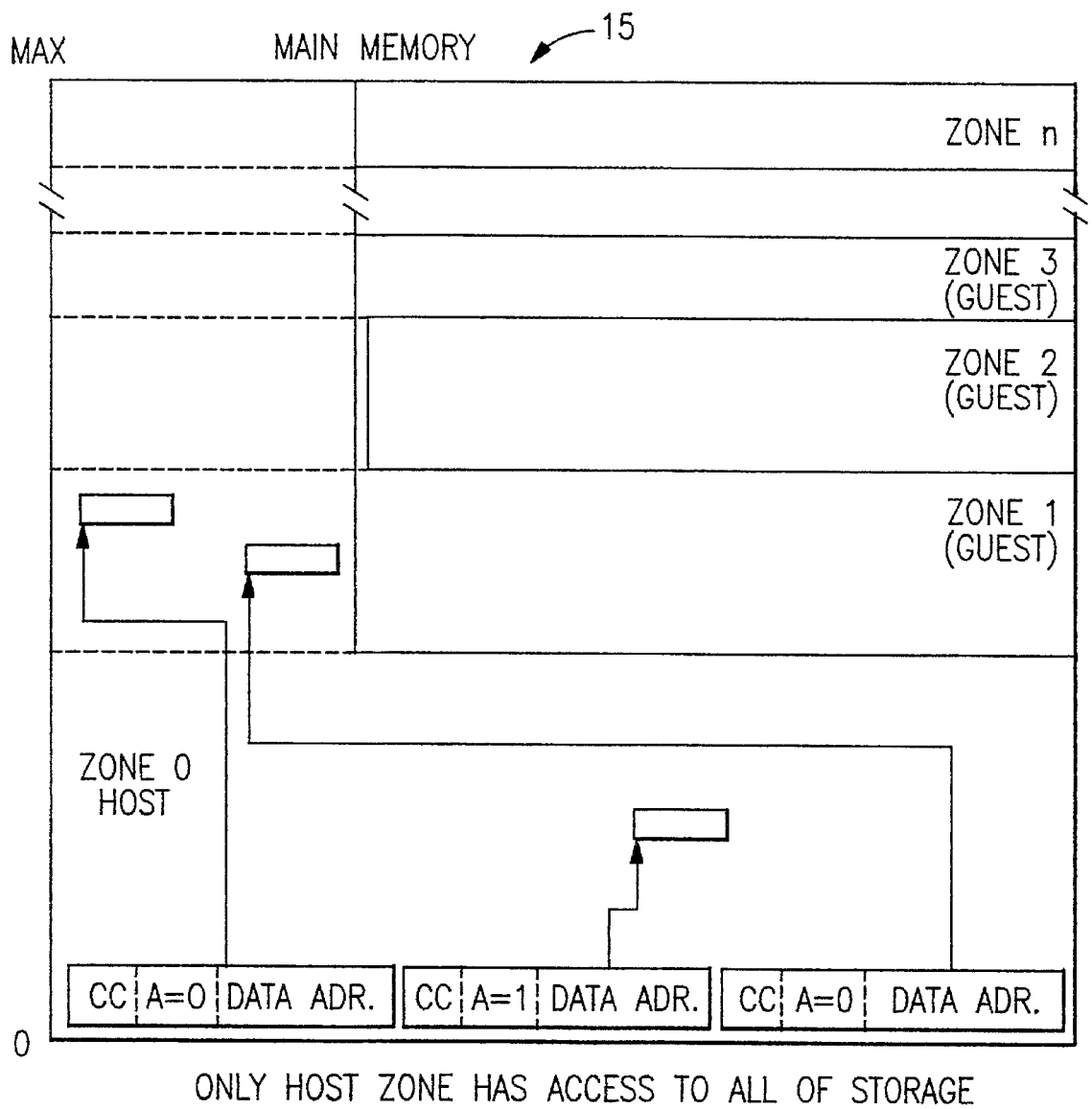
FIG. 2 represents a prior art host CCW processing which was used in the IBM ES/9000.

FIG. 2 represents a prior art CCW relocation facility which has been used in the IBM ES/9000. In this prior art example the main memory 15 is illustrated by FIG. 2. The operating system can use a virtual address as the CCW data address under the hypervisor LPAR, and LPAR is required to perform CCW address translation prior to issuing START SUBCHANNEL. In this system the relocation mechanism the translated CCW, IDAW and I/O data area addresses are always located in the same zone, Zone 0, which is the host zone. The specific subchannel zone number is set =0, and data addresses are located within zone 0.

Figure 3:
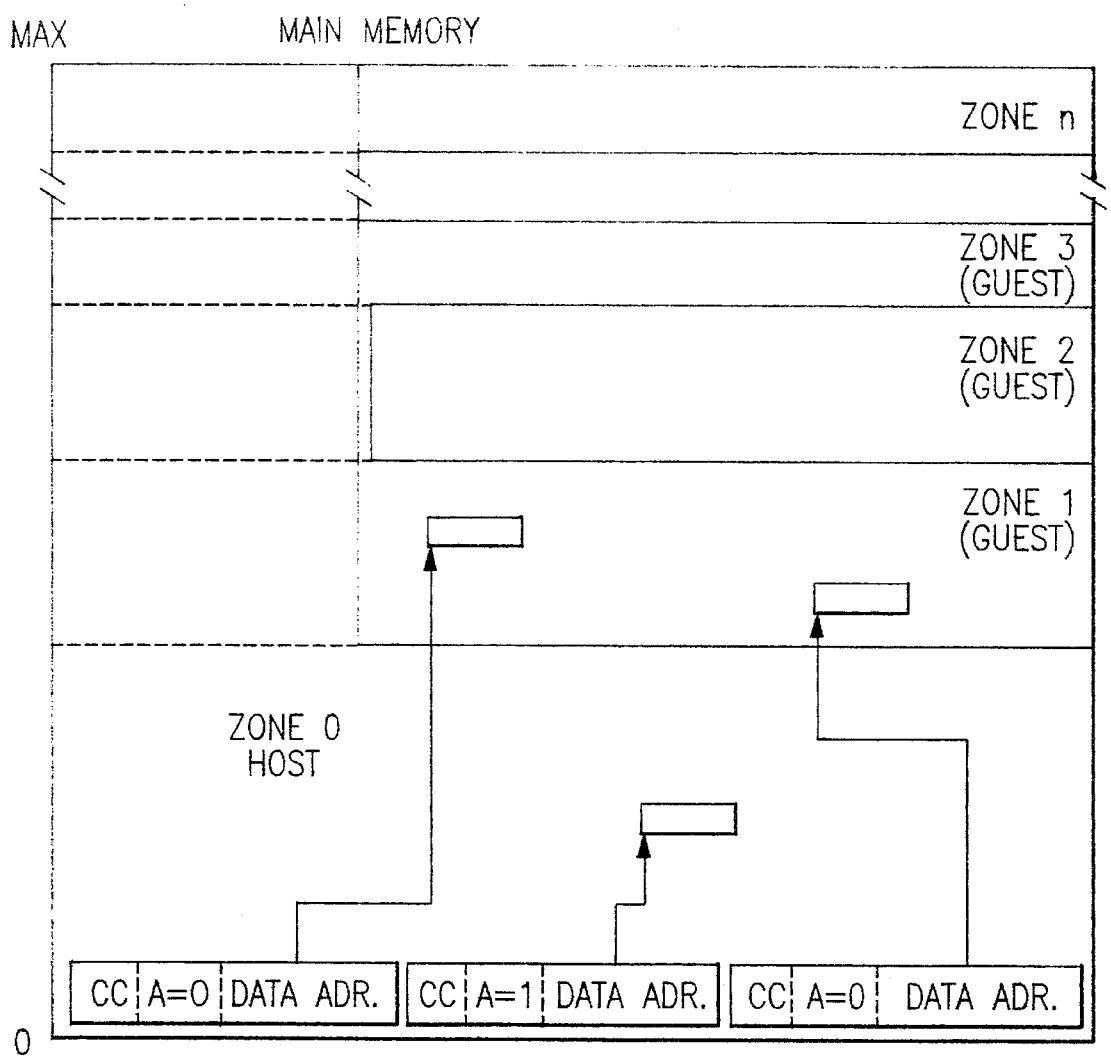
FIG. 3 shows a simplified illustration of a host use of the dynamic CCW data relocation facility.

FIG. 3 shows a simplified illustration of a host environment with multiple guest in accordance with the invention. In accordance with the invention the CCW data relocation facility allows the translated data address to be in the host zone, indicated by the A bit being set to 1, or in the guest zone, contained in the subchannel and indicated when the A bit is equal to 0. The intermixing capability enables the hypervisor to include both guest and host references within a single channel program. This is necessary to support channel programs which are self modifying.

Our invention will be implemented in a CEC with a zone relocation facility. Preferably the zone relocation facility will be provided in accordance with U.S. patent application Ser. No. 08/014,977 filed Feb. 8, 1993 by K. J. Duvalsaint et al and entitled "Multi-Zone Relocation Facility Computer Memory System". Because the channel program can reference guest space as a relative address within the guest space, the reference is independent of the absolute location of the guest space. While other machines have not had dependency on the absolute location of guest space, the zone relocation facility incorporates this. The removal of the dependence on the absolute location of the guest space allows the guest space to be moved while the channel program is executing. With this facility, the channel program need not be stopped and retranslated to map to a new guest location.

Figure 4:
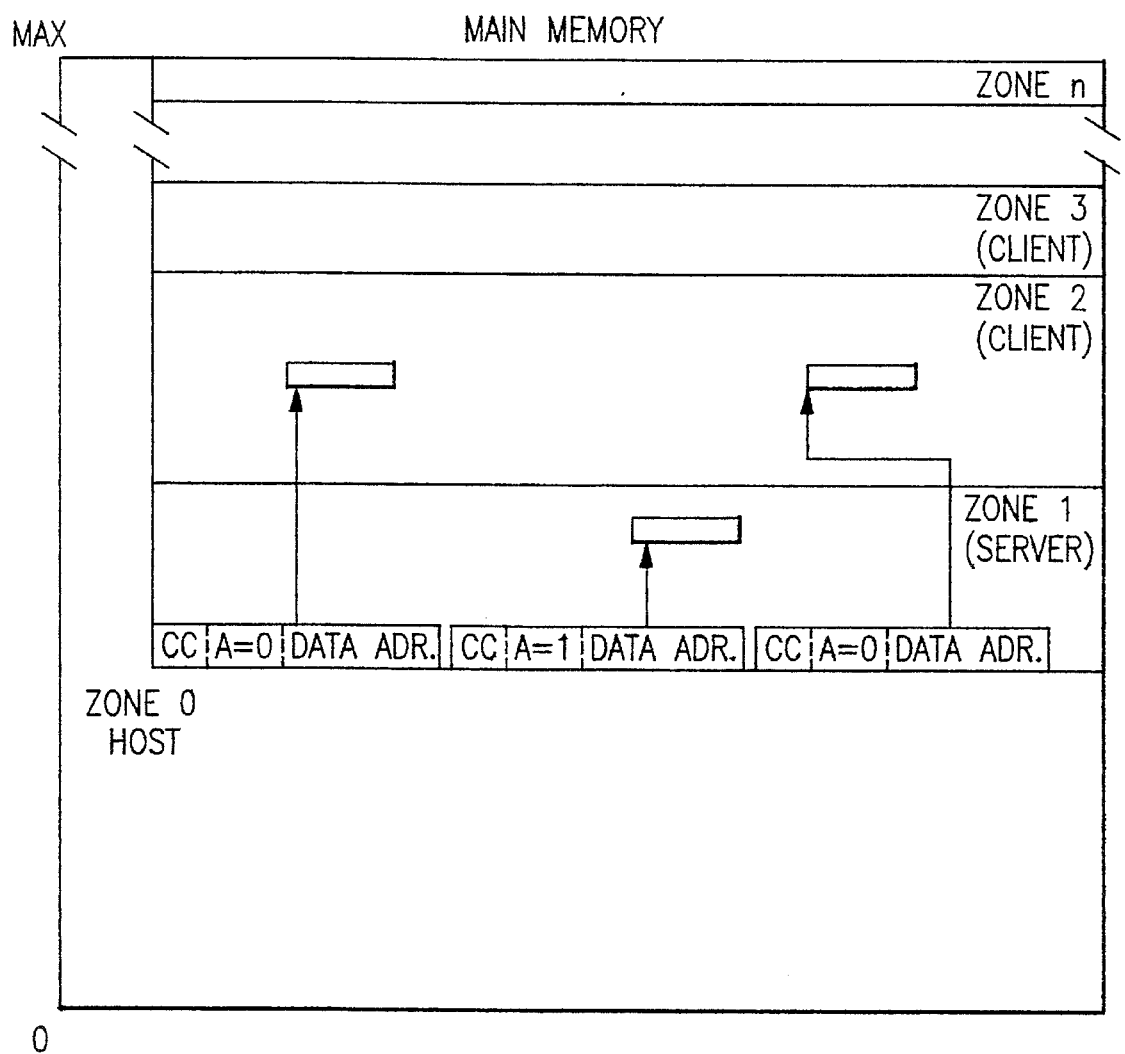
FIG. 4 shows a simplified illustration of a server using the dynamic CCW data relocation facility to provide data to it's clients.

FIG. 4 represents a data server partition with client memory partitions. As illustrated the data server functions in it's own logical partition with some of it's clients residing in other logical partitions. The server partition is given authority to use the CCW data relocation facility via user interfaces on the system console. This allows the server to construct channel programs which move data to/from the client(s) memory.

As described in FIG. 3, the A bit is used so that the channel subsystem is to use the zone of the issuer of the SSCH instruction (A=1) or the zone of the start subchannel instruction (A=0) for data address relocation.

Figure 5:
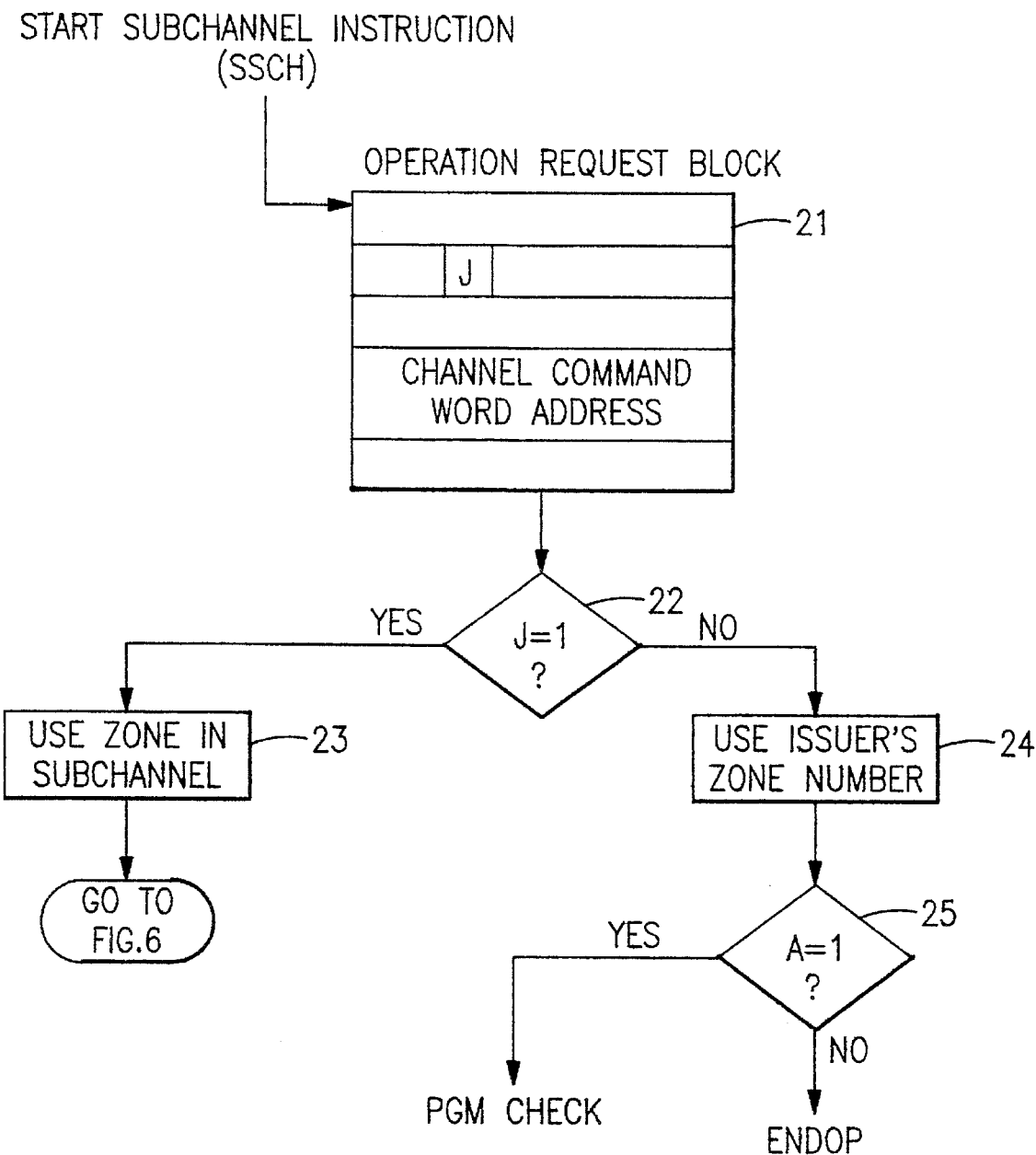
FIG. 5 represents the flow chart of the invention.
Figure 6:
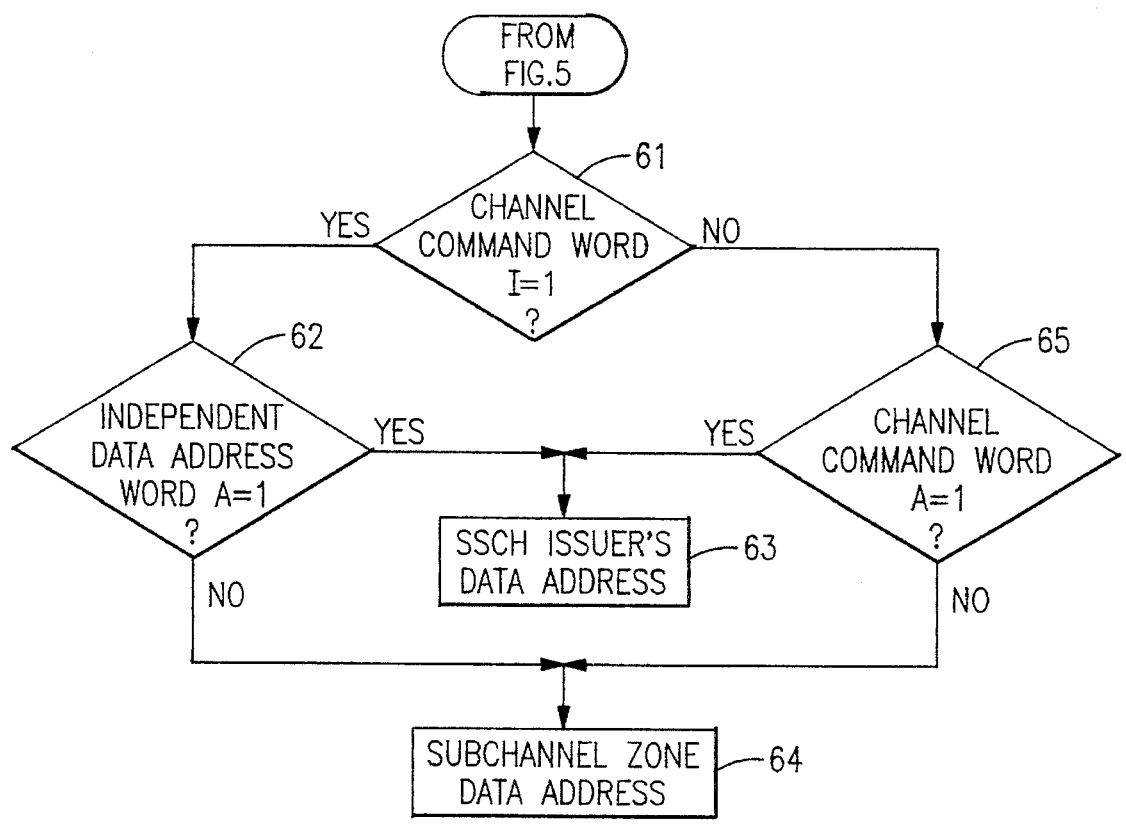
FIG. 6 represents the flow chart of the invention as it applies to supporting both CCWs and IDAWs.

FIGS. 5 and 6 represent the flow chart of the LPAR virtual address relocation process.

The operation-request block (ORB) is the operand of a START SUBCHANNEL instruction. The "J" bit in the ORB (21) specifies the source of the zone number that the CCW address relocation is based on. If this bit is one, then relocation is performed based on the zone origin of the zone specified in the start subchannel instruction. If this bit is zero, then relocation is performed based on the zone origin of the zone of the program issuing the SSCH. In IBMs implementation for LPAR, the CCW address will be a host absolute address when the bit is 0.

If the "J" bit was zero and the "A" bit in the CCW or IDAW is 1 then a program check is presented to the issuing program. Otherwise, all data addresses are relocated based on the zone in the start subchannel instruction.

If the "J" bit is one, the "A" bit ,in either the CCW or IDAW (I bit in the CCW=1), when one causes relocation to be based on the issuers zone number and when zero causes relocation to be based on the zone specified in the start subchannel instruction.

Figure 7:
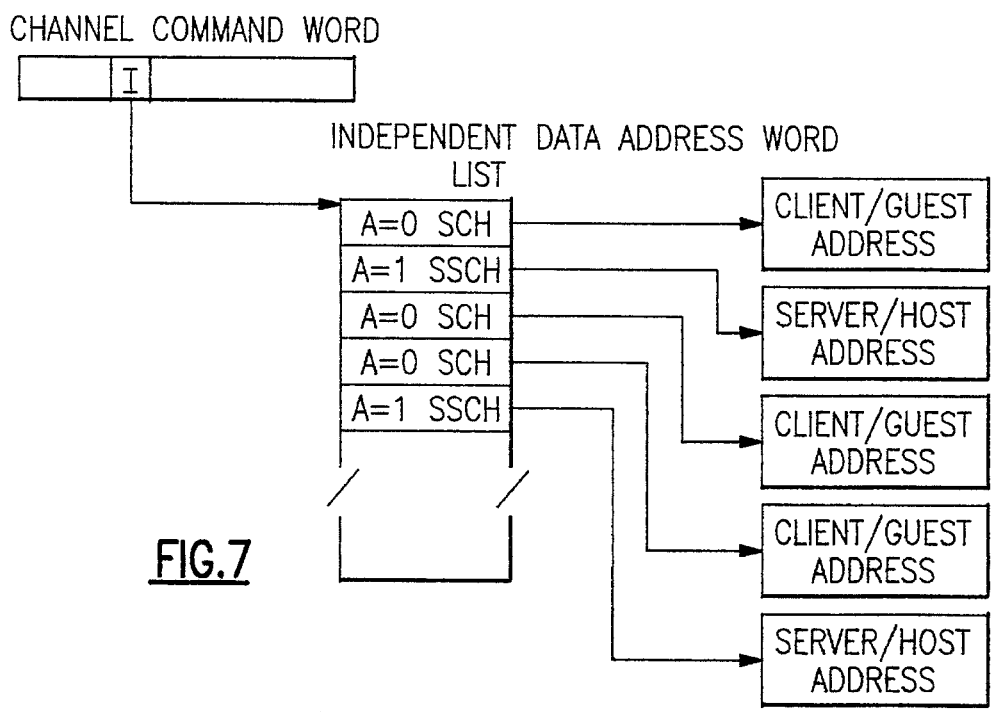
FIG. 7 represents use of the invention with an intermix of client/guest storage and server/host storage references within a single IDAW list.

FIG. 7 represents the CCW relocation utilizing the intermix of client/guest storage and server/host storage references within a single IDAW list. The IDAW list can specify either the server/host storage spaces or the client/guest storage spaces by utilizing A bit. Accordingly, the invention allows intermixing of these references within a single IDAW list.

ALTERNATIVE EMBODIMENTS

We believe the above embodiment is preferable to other alternative approaches to achieve the result. For instance, alternatively utilizing the hardware illustrated by FIG. 1, two transfer-in-channel commands would be used. The CCW would have a special transfer-in-channel indicating that a next CCW contains a host absolute address and another CCW with a special TIC would indicate that the next CCW address contains a guest absolute address. Still in a third alternative one could use a transfer-in-channel and put a code in the upper 4 bits to indicate that the address is an absolute address in memory. The later embodiment would use the left byte of the length field to contain the op code.

As has been illustrated in detail, in the alternative and preferred embodiments, the invention provides a general facility that will be used by PR/SM hypervisors to build channel programs that reside in the hypervisor space. They can directly use guest/client specified addresses without translation to host Absolute by the Hypervisor. The prior need for the PR/SM Hypervisor to Limit check guest data space addresses is eliminated, thus eliminating code and enhancing performance. Thus our invention can be used to provide enhanced dynamic storage relocation permitting the guest area to be moveable.

What is claimed is:

1. A computer system comprising:

a digital processing unit (CEC) having a main store divided into partitioned zones including a host zone and a plurality of client zones with translated data addresses in said host zone or one or more of said plurality of client zones;

said digital processing unit (CEC) including a channel subsystem and a channel subsystem program for addressing said host zone and said plurality of client zones with a relative address within a respective one of said plurality of client zones;

means for dynamically relocating a memory space for one or more applications of a client in said client zone;

said means for dynamically relocating a memory space including a start subchannel instruction that specifies a zone for relocation of a channel command word (CCW) address;

means to decode said start subchannel instruction to relocate a channel command word address to a zone based on a zone origin of a program issuing said start subchannel instruction in one state of said start subchannel instruction and to relocate said channel command word address to a zone based on a zone origin specified in said start subchannel instruction in another state of said start subchannel instruction.

2. A computer system according to claim 1 wherein, a start subchannel instruction can specify an absolute storage address anywhere in the main store.

3. A computer system according to claim 2 wherein the digital processing unit (CEC) supports client zones that reside in the same physical system but in different logical host zones and including means for causing data to be read directly into a client zone when the channel subsystem starts I/O operations.

4. A computer system according to claim 1 wherein the Channel Command Word dynamic memory relocation means has means for allowing channel command words and Indirect-Data-Address words to be located in a zone other than the one specified in the start subchannel instruction and the data address to be either in the zone where a start subchannel instruction is issued or in the zone specified in the start subchannel instruction.

5. A computer system according to claim 4 wherein a subsystem instruction defines a bit in an operation request block which controls the location of the CCW address.

6. A computer system according to claim 4 wherein a subsystem instruction defines a portion of the bits in the CCW and in the IDAW which control the location of the data address.

7. A computer system according to claim 4 wherein a Start Subchannel Instruction has a relocation indicator which when set to one value indicates that the CCW address is based on the zone of the issuer of the Start Subchannel Instruction and a Start Subchannel Instruction has an address indicator in a channel control word which specifies whether the data address is a start subchannel issuers address or an address in the zone specified in the Start Subchannel Instruction.

8. A computer system according to claim 7 wherein when the instruction indicator is set and an indirect-data-address (I) indicator is set, the address indicator in the IDAW specifies whether the data address is a start subchannel issuers address or an address in the zone specified in the start subchannel instruction.

9. A computer system according to claim 1 wherein the digital processing unit (CEC) can translate a CCW without modifying client zones and a channel subsystem program can access data from a client zone and a host zone.

10. A computer system according to claim 9 wherein the channel subsystem program can ask the digital processing unit (CEC) to put data anywhere in the host zone.

11. A computer system according to claim 9 wherein the channel subsystem program can ask the digital processing unit (CEC) to put data anywhere in the host zone, with means for expanding the host zone size and permitting a program to dynamically respond to a need for memory by changing the host zone and moving data to an expanded host zone while other activities are being processed.

12. A computer system according to claim 7 wherein the channel program channel command words (CCWs) can be located in the host zone and data can be located in the client zone.

* * * * *